July 22, 1924.

L. G. DE KERMOR

SELF REGULATING WATER HEATER

Filed Dec. 2, 1921

INVENTOR
Louis. G. de Kermor

Per Caron+Caron

Attorneys.

July 22, 1924.

L. G. DE KERMOR 1,502,295

SELF REGULATING WATER HEATER

Filed Dec. 2, 1921   3 Sheets-Sheet 2

INVENTOR
Louis G. deKermor

Per  Caron+Caron
Attorneys

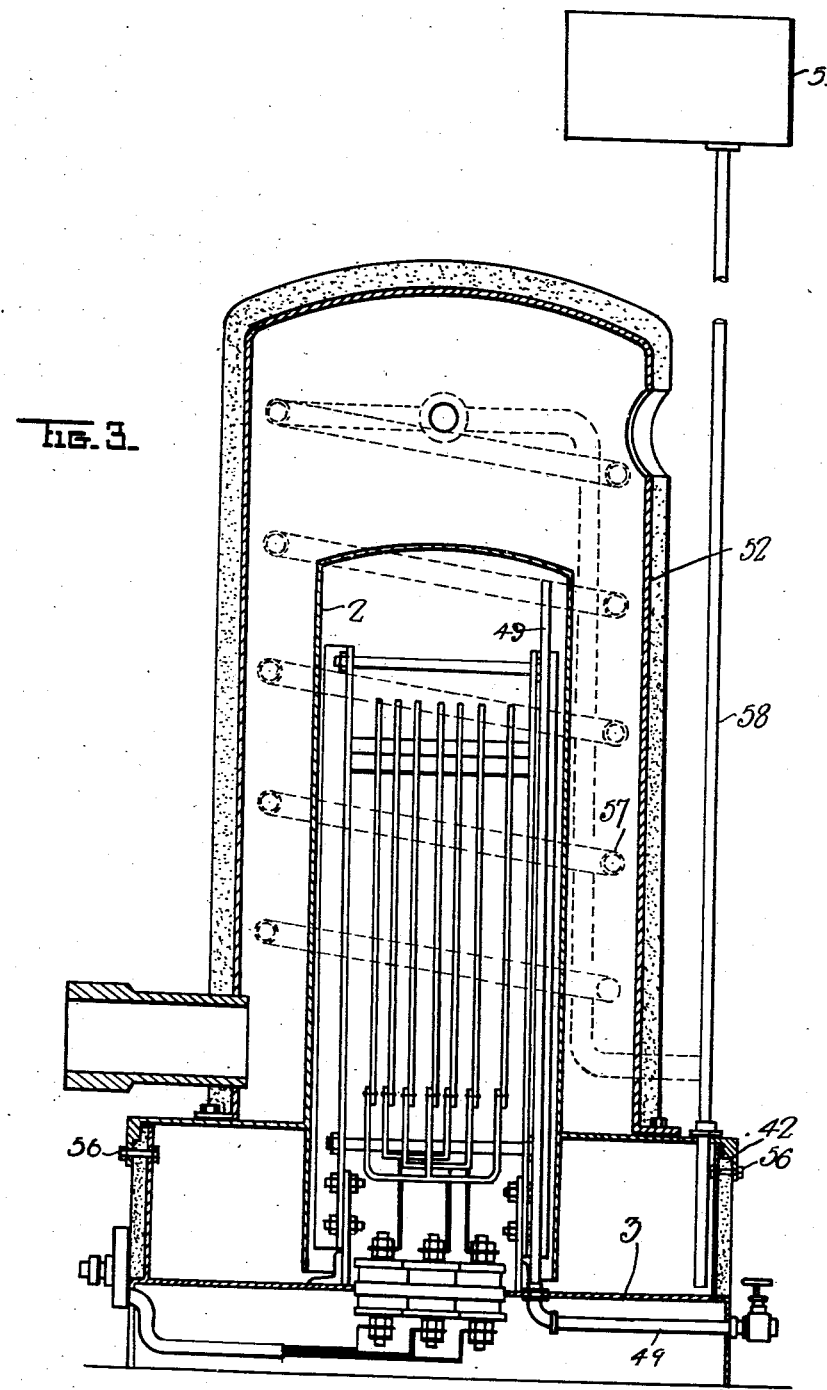

Patented July 22, 1924.

1,502,295

UNITED STATES PATENT OFFICE.

LOUIS G. DE KERMOR, OF EDMONTON, ALBERTA, CANADA, ASSIGNOR TO DE KERMOR ELECTRIC HEATING COMPANY LIMITED, OF EDMONTON, PROVINCE OF ALBERTA, CANADA.

SELF-REGULATING WATER HEATER.

Application filed December 2, 1921. Serial No. 519,427.

*To all whom it may concern:*

Be it known that I, LOUIS G. DE KERMOR, a subject of the King of Great Britain, residing at Edmonton, in the Province of Alberta and Dominion of Canada, have invented certain new and useful Self-Regulating Water Heaters, of which the following is a specification.

My invention relates to self-regulating water heaters based on the principle of a method described and claimed in my co-pending application filed Dec. 2, 1921, Serial No. 519,425. By this method the heat is regulated by immersing an electrode in a column of water capable of being displaced by the vapor generated by the current passing therethrough so as to vary the active area of the electrode in proportion to the heat radiated.

One object of my invention being to produce a self-regulating water heater, for domestic or general purposes, of compact form, economical in use and very positive in action.

A further object being to provide my heater with an adjustable by-pass so as to limit the temperature of available water.

A further object is to produce a water heater capable of being connected to present heating systems in buildings, etc.

In the drawings accompanying this specification,

Fig. 3 is a modified form having a separate coil enclosed in the water heating tank for supplying the domestic hot water service.

Figure 1:
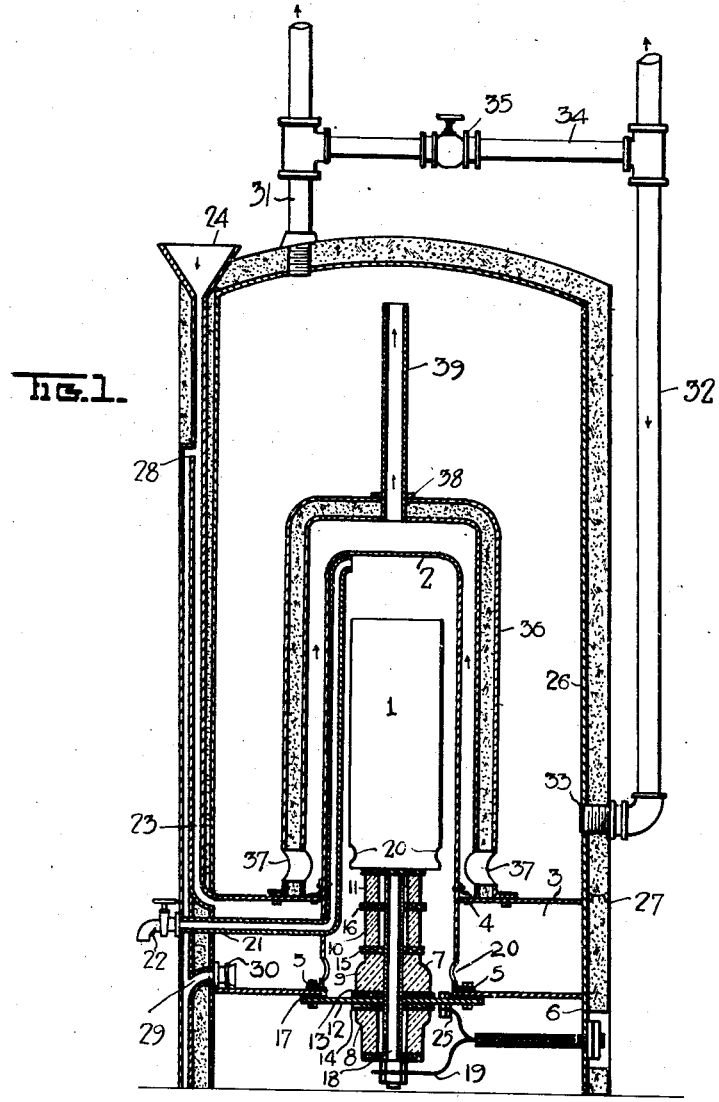
Figure 1 is a vertical section of a self-contained water heater adapted to domestic services.

In the accompanying drawings, 1 is the electrode which may be formed of one element or comprised of blocks of electrodes. (In larger apparatus the three-wire system may be used.) 2 is the casing enclosing the electrodes. This casing is closed at the top, the bottom being surrounded by a reservoir 3 preferably removably connected thereto as at 4 and 5. The sides of this reservoir may extend past the bottom thereof as shown at 6 to form a standard supporting the apparatus. The electrode 1 is preferably mounted on an insulating base 7 composed of superposed porcelain sections having coinciding central perforations. A plate 12 is held by the lower sections 8 and 9 between gaskets 13 and 14. Sections 9, 10 and 11 also rest on gaskets 15 and 16 as shown. Plate 12 is connected to the bottom of casing 2 over gasket 17 by bolts 5. Electrode 1 is connected to a source of current, not shown, by wire 19 extending therefrom and connected to a rod 18 passing through the base 7, said rod serving also to unite the sections of the base. A second leading wire is grounded to the apparatus at 25. Communication between the casing 2 and reservoir 3 is obtained by perforations 20 around the base of casing 2. A pipe 21 extending up to the top of casing 2 serves as a vent to remove the air from the casing. This pipe is provided with a valve 22 mounted on its outer end. A pipe 23 provided with a funnel 24 serves to fill tank 3 and casing 2. Pipe 23 is provided with an overflow 28. This overflow may have a drain outlet 29 provided with a valve 30 to drain water from tank 3. 26 is a water tank mounted over reservoir 3 and made removable at 27 by any practical means not shown. A hot water outlet pipe 31 is mounted over tank 26 and a return pipe 32 leads into the tank at 33. In order to determine the degree of heat of the service water, a by-pass 34 is mounted between pipes 31 and 32. By-pass 34 is provided with a valve to enable the regulating of the amount of water passing therethrough. In order to confine the circulation of the water inside the tank 26 so as to direct the same against the wall of the heat radiating casing 2, an insulated deflector 36 is placed over casing 2. This deflector is provided with openings 37 at its bottom and an outlet 38 at the top into which a pipe 39 is mounted so as to direct the hot water close to the upper end of the water tank 26.

The heater above described is entirely self-regulating and once started will require no attention whatever.

The operation is as follows: To start the heater, valve 22 of vent pipe 21 is opened. Water is poured in funnel 24 and enters reservoir 3 through pipe 23, the pouring of water being continued until casing 2 is completely filled and water runs out from valve 22. Valve 22 is then closed and the electric current turned on. The heat generated by the resistance of the water will produce vapor which will accumulate at the top of casing 2 and displace the column of water, thereby gradually decreasing the active area of the electrode. When the column of water reaches a point where its weight equals the pressure of the vapor it will remain at a standstill until the radiation from the casing 2 reduces the temperature of the vapor and lowers its pressure. The column of water will then be drawn upwards, owing to the partial vacuum formed at the top of casing 2. This will increase the active area of the electrode thereby raising the temperature and pressure of the vapor causing the water column to again move downward.

Figure 2:
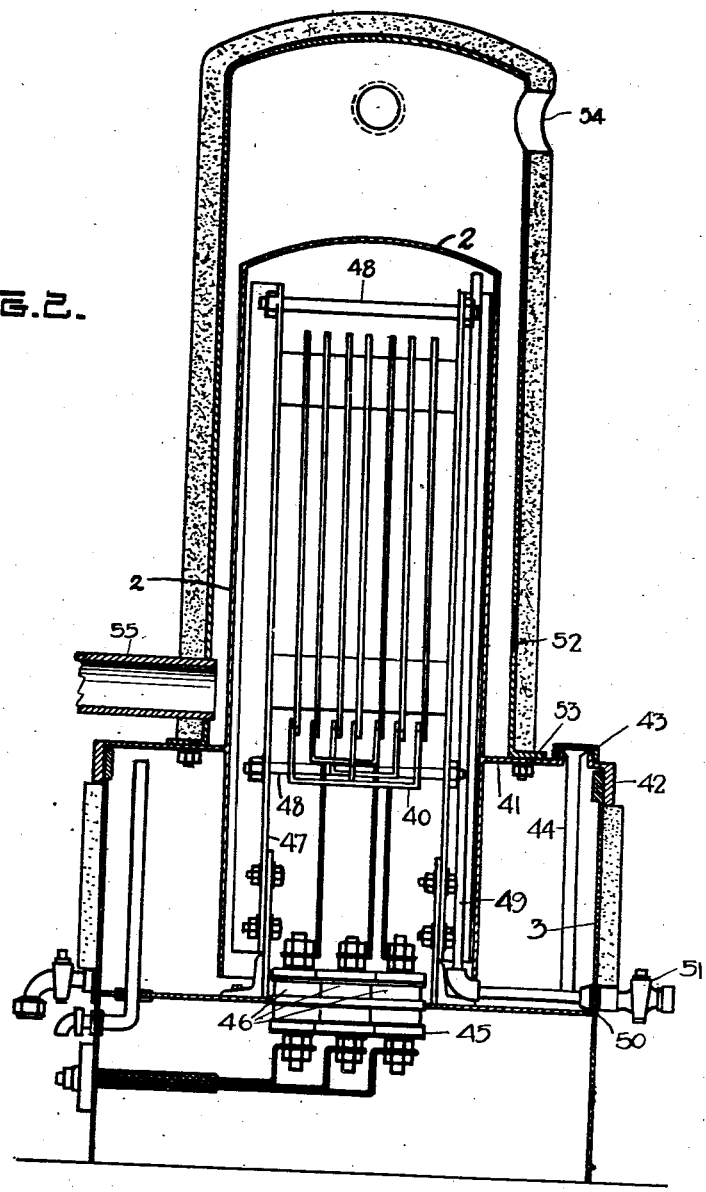
Fig. 2 is a modified form of my heater applicable to the heating of buildings, etc.

In the modification illustrated by Fig. 2, I have shown a construction adaptable for circulating water for the heating of buildings or for heating large quantities of water. In this apparatus I make use of a block of electrodes 40 connected to a source of alternating current by the three-wire system. In this construction the expansion reservoir 3 is separate from the regulating casing 2, casing 2 being provided with an extension flange 41 having a rim 42 overlapping the side of tank 3. Extension flange 41 is provided with filling aperture 43. A tube 44 forms a continuation of aperture 43 so as to lead the filling water close to the bottom of tank 3. In order to displace the air at the top of casing 2 I make use of a siphoning device or an air pump, not shown, which may be connected to valve 51 or to pipe 49.

The block of electrodes 40 is mounted on the bottom of tank 3 and is supported into casing 2 by means of a frame 47 which consists in upright cross bars united by rods 48 as shown. The electrodes, which are shown of rectangular form, are insulated from each other and from the frame by means of porcelain insulators clamped between the frame. The electrodes are electrically connected by three leads passing through the bottom of casing 2 and insulated therefrom by insulators 45 and 46. In order to draw the air out of casing 2 a vent pipe 49 is mounted inside the casing and comes out on the side of tank 3 at 50. A valve 51 is placed on the outer end of said pipe outside of casing 2. Over the extension flange 41 a jacket 52 is mounted. It is preferably connected to flange 41 by means of bolts 53. This jacket serves as a hot water tank where the water is heated by the radiation of heat from casing 2. Jacket 52 is provided with an outlet 54 and an inlet 55. The jacket and the reservoir are both lined with insulating material as shown.

In the modification represented by Fig. 3 I have shown an apparatus provided with a block of electrodes excited by a three-wire system as in Fig. 2 and provided with a jacket serving as a water heating chamber similar to that described in Fig. 2 but the reservoir 3 in this case is not removable. It is united by bolts 56 passing through flange 42 and the side of the reservoir. In this modification, I have shown a coil 57 mounted between casing 2 and jacket 52. The purpose of this coil is to heat water for domestic use independently of the water for heating purposes. In order to displace the air in the top of casing 2 and to obtain the weight of a column of water corresponding to a required pressure of vapor I make use of an expansion tank 59 connected to the reservoir 3 by pipe 58. Reservoir 3 and casing 2 is filled from this tank and the air displaced comes out by vent pipe 49.

The construction above described in connection with Fig. 1 as well as the modification represented by Figs. 2 and 3 illustrate practical applications of my regulating method described in my copending application above mentioned. It must be understood, however, that many variations comprising changes in form or disposition of parts may be made without departing from the essence of the following claims.

Claims:

1. In a self-regulating water heater, a casing closed at the bottom, a water heating casing of smaller capacity mounted therein, a supplementary tank forming part of the main casing positioned above the closed bottom thereof, communication ports between said supplementary tank and the water heating casing, an electrode support mounted through the bottom of the supplementary tank and insulated therefrom, means to fill the tank with water, and means inside of the water heating casing to completely remove the air therefrom.

2. In a self-regulating water heater, a casing closed at the bottom, a water heating casing of smaller capacity mounted therein, a supplementary tank forming part of the main casing positioned above the closed bottom thereof, communication ports between said supplementary tank and the water heating casing, an electrode support mounted through the bottom of the supplementary tank and insulated therefrom, means to fill the tank with water, means inside of the water heating casing to completely remove the air therefrom, an insulated casing over said water heating casing, an outlet at the top of said insulated casing, and a pipe in said outlet leading to a point adjacent the top of the main casing.

L. G. DE KERMOR.

In the presence of—
M. GRIMES,
M. BLACK.